United States Patent
Buschmann

(10) Patent No.: US 11,136,714 B2
(45) Date of Patent: Oct. 5, 2021

(54) METHODS OF OPTICAL BRIGHTENING AGENT REMOVAL

(71) Applicant: Clean Chemistry, Inc., Boulder, CO (US)

(72) Inventor: Wayne E. Buschmann, Boulder, CO (US)

(73) Assignee: Clean Chemistry, Inc., Boulder, CO (US)

(*) Notice: Subject to any disclaimer, the term of this patent is extended or adjusted under 35 U.S.C. 154(b) by 273 days.

(21) Appl. No.: 15/658,709

(22) Filed: Jul. 25, 2017

(65) Prior Publication Data
US 2018/0023250 A1    Jan. 25, 2018

Related U.S. Application Data

(60) Provisional application No. 62/366,397, filed on Jul. 25, 2016.

(51) Int. Cl.
*D21C 5/02*    (2006.01)

(52) U.S. Cl.
CPC ............ *D21C 5/022* (2013.01); *Y02W 30/64* (2015.05)

(58) Field of Classification Search
CPC ..... D21C 9/166; C08J 2300/24; C07C 409/26
USPC ............................................................ 162/5
See application file for complete search history.

(56) References Cited

U.S. PATENT DOCUMENTS

| | | | |
|---|---|---|---|
| 3,719,552 A | 3/1973 | Farley | |
| 4,055,505 A * | 10/1977 | Gray | ........................ C11D 3/12 252/186.2 |
| 4,076,621 A | 2/1978 | Hardison | |
| 4,348,256 A | 9/1982 | Bergstrom, Jr. et al. | |

(Continued)

FOREIGN PATENT DOCUMENTS

| | | |
|---|---|---|
| CN | 102007230 A | 4/2011 |
| EP | 0480469 A3 | 4/1992 |

(Continued)

OTHER PUBLICATIONS

Roberto Pedros, Ismael Moya, Yves Goulasb and Stephane Jacquemoud, Feb. 15, 2008, p. 1 (Year: 2008).*

(Continued)

*Primary Examiner* — Eric Hug
*Assistant Examiner* — Elisa H Vera
(74) *Attorney, Agent, or Firm* — Snell & Wilmer L.L.P.

(57) ABSTRACT

In some embodiments, a method relates to removal of optical brightening agents (OBA) from a substrate using peracetate oxidant solutions. A method may include reducing the microbial load in white water of water recycle loops. The methods may include providing a peracetate oxidant solution. The peracetate solution may include peracetate anions and a peracid. In some embodiments, the peracetate solution may include a pH from about pH 10 to about pH 12. In some embodiments, the peracetate solution has a molar ratio of peracetate anions to peracid ranging from about 60:1 to about 6000:1. In some embodiments, the peracetate solution has a molar ratio of peracetate to hydrogen peroxide of greater than about 16:1. The peracetate solution may provide bleaching, sanitizing and/or disinfection of water, pulp, substrates and/or surfaces. The peracetate oxidant (Continued)

solution may provide enhanced separation of dyeing agents from a substrate.

19 Claims, 4 Drawing Sheets

(56) References Cited

U.S. PATENT DOCUMENTS

| | | | |
|---|---|---|---|
| 4,393,037 A | 7/1983 | Delaney et al. | |
| 4,576,609 A | 3/1986 | Hageman | |
| 4,673,473 A | 6/1987 | Ang et al. | |
| 4,722,773 A | 2/1988 | Plowman et al. | |
| 4,872,953 A * | 10/1989 | Smith | D21B 1/32 |
| | | | 162/261 |
| 4,952,276 A | 8/1990 | Gidlund | |
| 4,966,706 A * | 10/1990 | Gregor | C02F 1/722 |
| | | | 210/609 |
| 5,053,142 A | 10/1991 | Sorensen et al. | |
| 5,246,543 A | 9/1993 | Meier et al. | |
| 5,387,317 A | 2/1995 | Parthasarathy et al. | |
| 5,424,032 A | 6/1995 | Christensen et al. | |
| 5,431,781 A | 7/1995 | Walsh | |
| 5,472,619 A | 12/1995 | Holzhauer et al. | |
| 5,494,588 A * | 2/1996 | LaZonby | C02F 1/50 |
| | | | 210/755 |
| 5,565,073 A | 10/1996 | Fraser et al. | |
| 5,683,724 A | 11/1997 | Hei et al. | |
| 5,770,035 A | 6/1998 | Faita | |
| 5,785,812 A | 7/1998 | Linsten et al. | |
| 5,817,240 A | 10/1998 | Miller et al. | |
| 6,007,678 A | 12/1999 | Linsten et al. | |
| 6,015,536 A | 1/2000 | Lokkesmoe et al. | |
| 6,126,782 A | 10/2000 | Liden et al. | |
| 6,183,623 B1 | 2/2001 | Cisar et al. | |
| 6,258,207 B1 * | 7/2001 | Pan | D21C 1/04 |
| | | | 162/27 |
| 6,294,047 B1 * | 9/2001 | Chakar | D21C 5/005 |
| | | | 162/5 |
| 6,387,238 B1 | 5/2002 | Merk et al. | |
| 6,569,286 B1 | 5/2003 | Withenshaw et al. | |
| 6,712,949 B2 | 3/2004 | Gopal | |
| 8,318,972 B2 | 11/2012 | Buschmann et al. | |
| 9,517,955 B2 | 12/2016 | Buschmann | |
| 9,517,956 B2 | 12/2016 | Buschmann | |
| 9,551,076 B2 | 1/2017 | Buschmann | |
| 10,259,729 B2 | 4/2019 | Buschmann | |
| 2001/0050234 A1 | 12/2001 | Shiepe | |
| 2002/0153262 A1 | 10/2002 | Uno et al. | |
| 2003/0019757 A1 | 1/2003 | Vetrovec | |
| 2003/0019758 A1 | 1/2003 | Gopal | |
| 2003/0024054 A1 | 2/2003 | Burns | |
| 2004/0112555 A1 | 6/2004 | Tolan et al. | |
| 2004/0134857 A1 | 7/2004 | Huling et al. | |
| 2004/0200588 A1 | 10/2004 | Walker | |
| 2005/0183949 A1 | 8/2005 | Daly | |
| 2006/0207734 A1 | 9/2006 | Day | |
| 2007/0212594 A1 | 9/2007 | Takasu et al. | |
| 2007/0243449 A1 | 10/2007 | Sotomura et al. | |
| 2009/0012346 A1 | 1/2009 | Al Nashef et al. | |
| 2009/0152123 A1 | 6/2009 | Butler et al. | |
| 2009/0285738 A1 | 11/2009 | Winter et al. | |
| 2009/0314652 A1 * | 12/2009 | Buschmann | C25B 1/28 |
| | | | 205/349 |
| 2010/0078331 A1 | 4/2010 | Scherson et al. | |
| 2010/0160449 A1 | 6/2010 | Rovison, Jr. et al. | |
| 2010/0176066 A1 | 7/2010 | Budde | |
| 2010/0179368 A1 | 7/2010 | Conrad | |
| 2011/0017066 A1 | 1/2011 | Takeuchi et al. | |
| 2011/0024361 A1 | 2/2011 | Schwartzel et al. | |
| 2011/0123642 A1 | 5/2011 | Wilmotte | |
| 2011/0232853 A1 | 9/2011 | Yin | |
| 2012/0067532 A1 | 3/2012 | Lee | |
| 2012/0091069 A1 | 4/2012 | Fischmann | |
| 2012/0108878 A1 | 5/2012 | Conrad | |
| 2012/0145643 A1 | 6/2012 | Pandya | |
| 2012/0240647 A1 | 9/2012 | Montemurro | |
| 2012/0267315 A1 | 10/2012 | Soane et al. | |
| 2012/0322873 A1 | 12/2012 | Atkins et al. | |
| 2013/0259743 A1 | 10/2013 | Keasler et al. | |
| 2013/0264293 A1 | 10/2013 | Keasler et al. | |
| 2014/0069821 A1 | 3/2014 | Marcin et al. | |
| 2014/0072653 A1 | 3/2014 | Buschmann | |
| 2014/0131217 A1 | 5/2014 | Buschmann | |
| 2014/0131259 A1 | 5/2014 | Goldblatt | |
| 2014/0205777 A1 | 7/2014 | Hawkins et al. | |
| 2014/0238626 A1 | 8/2014 | Tsuji et al. | |
| 2014/0374104 A1 | 12/2014 | Seth | |
| 2016/0068417 A1 | 3/2016 | Buschmann | |
| 2016/0297697 A1 | 10/2016 | Buschmann | |
| 2016/0318778 A1 | 11/2016 | Buschmann | |
| 2017/0051417 A1 | 2/2017 | Buschmann | |
| 2017/0107128 A1 | 4/2017 | Buschmann | |
| 2017/0114468 A1 | 4/2017 | Buschmann | |
| 2017/0158537 A1 | 6/2017 | Buschmann | |
| 2017/0159237 A1 | 6/2017 | Buschmann | |
| 2017/0335515 A1 | 11/2017 | Buschmann | |

FOREIGN PATENT DOCUMENTS

| | | | |
|---|---|---|---|
| FR | 2776312 A1 * | 9/1999 | D21C 9/166 |
| WO | 9739179 A1 | 10/1997 | |
| WO | 1999032710 | 7/1999 | |
| WO | 2000069778 | 11/2000 | |
| WO | 2008056025 A2 | 5/2008 | |
| WO | 2010059459 | 5/2010 | |
| WO | 2012166997 | 12/2012 | |
| WO | 2013060700 A1 | 5/2013 | |
| WO | 2013064484 | 5/2013 | |
| WO | 9402423 A1 | 2/2014 | |
| WO | 2014039929 | 3/2014 | |
| WO | 2014100828 | 6/2014 | |
| WO | 2016037149 | 3/2016 | |
| WO | 2016154531 | 9/2016 | |
| WO | 2017100284 | 6/2017 | |
| WO | 2017100299 | 6/2017 | |
| WO | 2018106285 A1 | 6/2018 | |

OTHER PUBLICATIONS

Elizabeth E. Coyle, Lindell E. Ormsbee, Gail M. Brion, Aug. 2014, Water Environment Research, p. 690 (Year: 2014).*
Gary A. Smook, Handbook For Pulp & Paper Technologists, 2001, Angus Wilde Publications, p. 215-219 (Year: 2001).*
English translation of FR 2776312 A1 translated by google. (Year: 1999).*
CC15—Suslow, T., "Oxidation-Reduction Potential (ORP) for Water Disinfection Monitoring, Control, and Documentation" Univ. California Publication 8149 http://anrcatalog.ucdavis.edu, Copyright 2004.
Co-Pending U.S. Appl. No. 15/601,350 entitled, "Methods of Pulp Fiber Treatment" to Buschmann filed May 22, 2017.
Co-Pending U.S. Appl. No. 15/658,709 entitled, "Methods of Optical Brightening Agent Rremoval" to Buschmann filed Jul. 25, 2017.
CC16—L.D. Shackford, "A Comparison of Pulping and Bleaching of Kraft Softwood and Eucalyptus Pulps;" 36th International Pulp and Paper Congress and Exhibition; Oct. 13-16, 2003, Sao Paulo, Brazil.
Notice of Allowance for U.S. Appl. No. 14/122,185 dated Oct. 13, 2016.
Notice of Allowance for U.S. Appl. No. 14/020,828 dated Aug. 11, 2016.
CC06—International Preliminary Report on Patentability for PCT/US2013/058650 dated Jan. 29, 2014.
CC07—Australian Examination Report No. 1 for 2013312249 dated Mar. 17, 2017.
CC08—Second Office Action for Chinese Application No. 2013800580496 dated Sep. 18, 2016.
CC09—Extended European Search Report for European Application No. EP 13 83 4576 dated Oct. 4, 2016.

(56) References Cited

OTHER PUBLICATIONS

Notice of Allowance for U.S. Appl. No. 15/206,901 dated Aug. 17, 2016.
Restriction for U.S. Appl. No. 14/846,123 dated Sep. 7, 2017.
CC10—International Preliminary Report on Patentability for PCT/US2015/048722 dated Feb. 8, 2016.
CC11—International Preliminary Report on Patentability for PCT/US2016/024207 dated Sep. 26, 2017.
CC12—International Search Report for PCT/US2016/065326 dated Feb. 24, 2017.
Non-Final Office Action for U.S. Appl. No. 15/371,872 dated Oct. 12, 2017.
CC13—International Search Report for PCT/US2016/065345 dated Feb. 17, 2017.
CC14—International Search Report for PCT/US2017/033824 dated Aug. 29, 2017.
CC01—International Search Report for PCT/US2012/040325 dated Feb. 1, 2013.
Non-Final Office Action for U.S. Appl. No. 14/122,185 dated Oct. 28, 2015.
Final Office Action for U.S. Appl. No. 14/122,185 dated Jul. 28, 2016.
Non-Final Office Action for U.S. Appl. No. 14/020,828 dated Jan. 20, 2016.
Notice of Allowance for U.S. Appl. No. 14/020,828 dated Mar. 30, 2016.
CC02—International Search Report for PCT/US2013/058650 dated Jan. 29, 2014.
CC03—First Office Action for Chinese Application No. 2013800580496 dated Feb. 4, 2016.
CC05—Supplementary Partial European Search Report for European Application No. EP 13 83 4576 dated May 10, 2016.
CC04—International Search Report for PCT/US2015/048722 dated Feb. 8, 2016.
Suihko et al.; "A study of the microflora of some recycled fibre pulps, boards and kitchen rolls;" Journal of Applied Microbiology; 1997; 83; pp. 199-207.
Verween et al.; "Comparative toxicity of chlorine and peracetic acid in the biofouling control of Mytilopsis leucophaeata and Dreissena polymorpha embryos"; International Biodeterioration & Biodegradation; Jun. 1, 2009; vol. 63, No. 4; pp. 523-528.
Szabo et al., Utilization of NaClO and H2O2 as Source of the Singlet Oxygen for the Environmental Bleaching of Pulp, 1994, Cellulose Chem. Technol., 28, 183-194.
Smook, Handbook for Pulp & Paper Technologists, 1992, Chapter 4: Overview of Pulping Methodology and Chapter 7: Kraft Pulping, Fifth printing 2001, Angus Wilde Publications, Vancouver B.C., pp. 36-44 and 74-83.

* cited by examiner

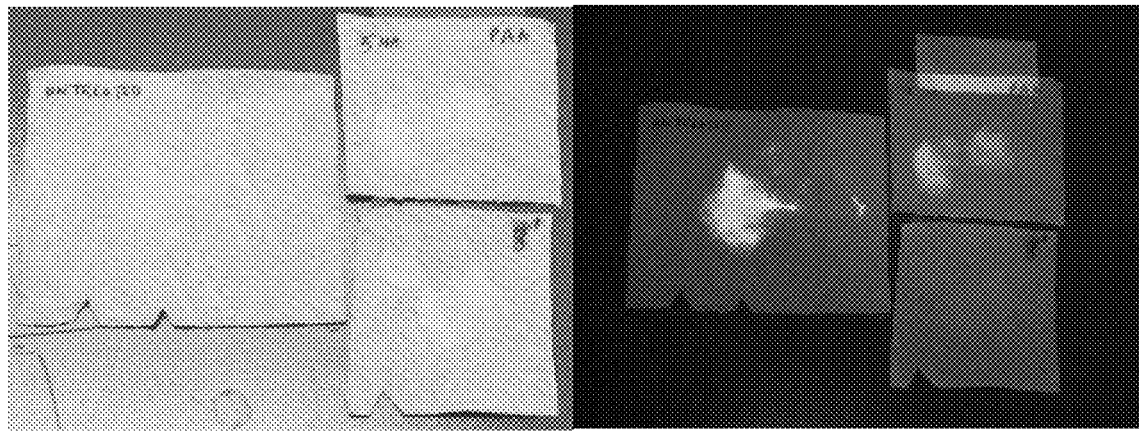
*Fig. 4A*  *Fig. 4B*
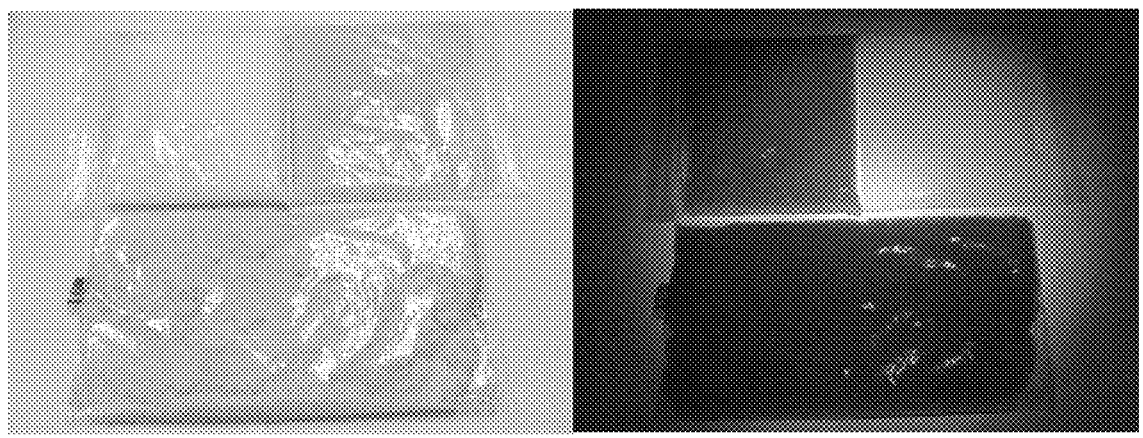
*Fig. 5A*  *Fig. 5B* ered in water treatment processes peracetate oxidant solutions is known to have its most active oxidative activity in the pH range of about pH 10 to 12. In-situ ROS generation, such as singlet oxygen, by peracetate oxidant solutions is expected to be most active near pH neutral to alkaline conditions.

METHODS OF OPTICAL BRIGHTENING AGENT REMOVAL

PRIORITY CLAIM

This application claims priority to U.S. Provisional Patent Application No. 62/366,397 entitled "METHODS OF OPTICAL BRIGHTENING AGENT REMOVAL" filed on Jul. 25, 2016, all of which is incorporated by reference herein.

BACKGROUND OF THE INVENTION

1. Field of the Invention

The present disclosure generally relates to oxidizing, degrading and removal of optical brightening agents (OBA) using peracetate oxidant solutions. The disclosure relates to a method of removal of OBA from a substrate. The disclosure more particularly relates to a method of removal of OBA from fibers and water recovered from the paper making process involving the use of peracetate oxidant solutions.

2. Description of the Relevant Art

Optical brightening agents (OBAs), fluorescent brightening agents (FBAs) or fluorescent whitening agents (FWAs) are dyes that absorb light in the ultraviolet and violet region (e.g., 300-400 nm) of the electromagnetic spectrum, and re-emit light in the blue region (e.g., 400-500 nm) with a maximum wavelength at 430 nm. These agents are often used to enhance the appearance of color of fabric and paper, causing a perceived "whitening" effect, making materials look less yellow. A white surface treated with an optical brightener emits more visible light in the blue region than shines on it, making it appear brighter.

OBAs are stabilized to degradation when deposited or sorbed onto surfaces. With natural cellulosic fibers the OBAs may deposit on the outside and inside of the fiber pore structure making it difficult to access with chemical treatments. Additives used in paper making may stabilize or encapsulate and protect OBAs on fibers. Examples of additives include polyvinyl acetate, polyamines, polyamino-amido glycol, polyethylene imine, polyaluminum chloride, alum, cationic starch products, sizing agents, retention particles and polyelectrolytes. OBA carriers may be used in paper making, such as in size press application, to improve bonding of OBAs to fibers for increased loading and brightening and to minimize OBA migration.

The most common class of chemicals with fluorescent brightening properties used in fine paper making are stilbene dyes that absorb energy in the UV portion of the spectrum and re-emit it in the blue portion of the visible spectrum. They were introduced in the 1940s and continue to be popular cost-effective agents used in the brightening process. This class of optical brightening dye is also used for brightening natural and synthetic textiles and in brightening detergents. Stilbene dyes include Uvitex 2B, Tonopal OB™, Blankophor BA, Leucophor®, Photine CBUS.

Sulfonated optical brighteners are one class of compounds including di-sulfonated stilbene-triazine derivatives, tri-sulfonated stilbene-triazine derivatives, tetra-sulfonated stilbene-triazine derivatives, hexa-sulfonated stilbene-triazine derivatives, and mixtures thereof. An example of this class of dye materials includes 4,4-bis-(2"-methoxy-4""-phenylamino-1"",3",5"-triazine-6"-ylamino) stilbene-2,2"-disulfonic acid as illustrated in FIG. 1.

Degradation of fluorescent brighteners can occur photochemically. The primary fading reactions of stilbene dyes are (E) to (Z) isomerization followed by oxidative cleavage of the central C═C bonds. The (Z)-isomers are not planar and thermal isomerization back to (E)-isomer is slow. Stilbenes are generally more susceptible to degradation in the solution phase than in the sorbed state on a surface or in a pore.

Spectrophotometric analysis of degradation can be achieved, a wavelength of 348 nm (Absorbance of 0.123) is known to be assigned to the fluorescent (E)-isomer having the trans-conformation of the central carbon-carbon double bond of the stilbene dye structure. The absorption band maximum at 278 nm (absorbance of 0.165) is known to be assigned to the virtually non-fluorescent (Z)-isomer having the cis-conformation of the central carbon-carbon double bond of the stilbene dye structure.

Reactive oxygen species including singlet oxygen ($^1O_2$), hydroperoxyl radical, hydroxyl radical and superoxide and ozone are effective at degrading organic materials. Singlet oxygen ($^1O_2$) is well known to be effective at oxidizing and degrading organic dyes containing electron-rich unsaturated and aromatic structures which may include sulfur or nitrogen atoms. Hydroperoxyl and superoxide radicals are known to be good radical initiators for degradation of materials.

Current practices for oxidizing, degrading and removal of OBAs from paper fiber include oxidation with chlorine dioxide or ozone, which may be conducted during pulp bleaching sequences. Repeated strong oxidation and bleaching treatments like this are damaging to cellulose fibers and can produce chlorinated oxidation byproducts or absorbable organic halogens (AOX). Quenching fluorescence with an additive is also used which allows for reduction of fluorescence but not the degradation or removal of the OBA.

Removing OBAs from fibers is challenging due to the stability of these dye materials to oxidizers such as hydrogen peroxide, peracetic acid and hypochlorite. An established approach for oxidative removal of OBAs from textile fibers (natural and synthetic) incorporate the use of potassium permanganate in highly acidic conditions over a period of about 30 minutes to several hours. Drawbacks with permanganate treatments are the addition of manganese, which can be highly colored, to the fiber product and to process water streams that must be treated or disposed of. Excess acid residuals must also be neutralized or disposed of.

The use of moderately alkaline conditions, pH 9.5 to 11.5, for pulp delignification is well known for swelling fibers to enhance access to interior fiber surfaces and enhance lignin breakdown reactions and extraction. This is especially important when using sodium sulfide, oxygen and/or hydrogen peroxide for delignification and Kraft pulping. Surfactants or detergents may also enhance the diffusion of water-phase chemicals around and into hydrophobic fiber surfaces.

At room temperature and temperatures normally encountered in water treatment processes peracetate oxidant solutions is known to have its most active oxidative activity in the pH range of about pH 10 to 12. In-situ ROS generation, such as singlet oxygen, by peracetate oxidant solutions is expected to be most active near pH neutral to alkaline conditions.

There are numerous drawbacks with conventional methods used to oxidize, degrade and remove OBAs. They include but are not limited to fiber damage, production of unwanted byproducts, reduced product yields, need for separate and/or segregated treatment processes, excess waste water generation, and higher total process costs.

There is a need for improved removal of OBAs from substrates used in a paper making process.

It is desirable to find an efficient and cost effective method of removal of OBAs in paper making process.

SUMMARY

In some embodiments, a method provides for oxidizing, degrading and removal of OBA from a substrate involving the use of peracetate oxidant solutions. The methods may include contacting the substrate with a peracetate oxidant solution, mixing the substrate with the peracetate oxidant solution, and oxidizing the OBA using the peracetate oxidant solution.

In some embodiments, a method provides for oxidizing, degrading and removal of OBA from a substrate during a paper making process.

In some embodiments, a method provides for oxidizing, degrading and removal of OBA from cellulosic fiber, broke and water recovered from the paper making process involving the use of peracetate oxidant solutions.

In some embodiments, a method provides for oxidizing, degrading and removal of OBA from a substrate involving the use of peracetate oxidant solutions. The methods may include providing a peracetate oxidant solution. The peracetate solution may include peracetate anions and a peracid. In some embodiments, the peracetate solution may include a pH from about pH 10 to about pH 12. In some embodiments, the peracetate solution has a molar ratio of peracetate anions to peracid ranging from about 60:1 to about 6000:1. In some embodiments, the peracetate solution has a molar ratio of peracetate to hydrogen peroxide of greater than about 16:1.

In some embodiments, the OBA removal occurs in the wet end of the paper making process avoiding the need for separate or segregated treatment processes for water, broke and cellulosic fiber.

In some embodiments, a method is provided for removal of OBA in paper mills thereby avoiding cross contamination of products that do not and cannot contain OBA.

In some embodiments, a method is provided for the degradation of OBA in cellulosic fiber and in process water streams (white water).

In some embodiments, a method is provided for the ability to use peracetate oxidant solution as an alternative oxidant to the use of chlorine or other halogenated oxidants to avoid the generation of halogenated oxidation byproducts.

In some embodiments, a method is provided for avoiding the need to return cellulosic fiber to the bleaching stage.

In some embodiments, the method is provided for reducing the waste water volume from a paper making process.

In some embodiments, heating or thermal activation of peracetate oxidant solutions to a temperature between about 38° C. to about 95° C. accelerates the formation of ROS and ROS daughter products. Thermal activation that accelerates ROS production rate is useful for degradation of OBA.

In some embodiments, a method may include adjusting an agitation of the mixing of the substrate with the peracetate oxidant solution such that as the agitation is increased an amount of the oxidation of the dyeing agents is increased.

In some embodiments, acidification of the substrate prior to addition of peracetate oxidant solution accelerates the degradation of the OBA.

In some embodiments, maintaining the substrate at a temperature between about 50° C. to about 95° C. accelerates the degradation of contaminants in the water including OBAs.

In some embodiments, the combination of acidification and thermal activation accelerates the degradation of the OBA. Acidic conditions normally inhibit ROS activity at room temperature however, the combination of acidic conditions and thermal activation of peracetate oxidant solution accelerates ROS production rate resulting in enhanced OBA degradation.

In some embodiments, a method is provided for reducing waste water volume used in treatment.

In some embodiments, a method is provided for reducing the microbial load in wet end paper making process.

An additional advantage of this invention is that the oxidative treatment with peracetate oxidant solutions contributes little damage to cellulosic fibers relative to chlorine dioxide and conventional bleach sequences.

In some embodiments, the peracetate oxidant solutions are particularly suited for use in water with high salinity, alkalinity and contamination as they rely on reactive oxygen species whose performance is little impacted or enhanced by such conditions, in contrast to common Fenton and advanced oxidation processes that produce hydroxyl radical or ozonides as the primary ROS. The peracetate oxidant does not form bromate in bromide-containing water under typical treatment conditions, which is a benefit for treated water discharge. In some embodiments, the peracetate oxidant has a very low organic halide formation potential in wastewater treatment and pulp bleaching compared to chlorine and chlorine dioxide.

In some embodiments, the peracetate oxidant is generated at, or near, the point of use as an aqueous solution due to its high activity and relatively short half-life of minutes to hours depending on concentration and use conditions. The oxidant is active long enough to serve as a degradation tool before it attenuates leaving benign and readily degradable residuals including oxygen, sodium acetate and glycerol.

In some embodiments, the peracetate oxidant solution has low volatility because it is a solid in its native form and it forms a mildly alkaline solution. The peracetate oxidant solution can be significantly less corrosive in solution and the vapor phase than many common oxidants over a range of concentrations and temperatures. Low volatility is also a benefit for using peracetate oxidant in warm environments such as pulp bleaching and paper making.

BRIEF DESCRIPTION OF THE DRAWINGS

Advantages of the present invention may become apparent to those skilled in the art with the benefit of the following detailed description of the preferred embodiments and upon reference to the accompanying drawings.

FIGS. 4A-B depict photographs of untreated broke, partially treated broke and fully treated broke under visible light and under black light.

FIGS. 5A-B depict photographs of untreated broke, partially treated broke and fully treated broke under visible light and under black light.

Figure 1:
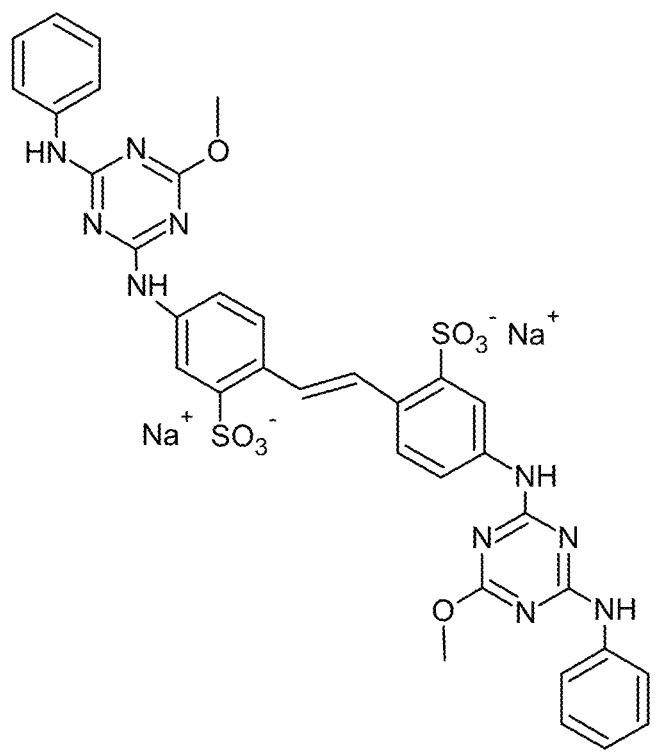
FIG. 1 depicts a representation of the chemical structure of 4,4-bis-(2"-methoxy-4""-phenylamino-1"",3",5"-triazine-6"-ylamino) stilbene-2,2"-disulfonic acid.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task. In some contexts, "configured to" may be a broad recitation of structure generally meaning "having a feature that" performs the task or tasks during operation. As such, the component can be configured to perform the task even when the component is not currently on.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 paragraph (f), interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION OF EMBODIMENTS

Definitions

Unless defined otherwise, all technical and scientific terms used herein have the same meaning as commonly understood by one of ordinary skill in the art.

The term "optical brightening agents" (OBAs) is a general term for dyes that absorb light in the ultraviolet and violet region (e.g., 300-400 nm) of the electromagnetic spectrum, and re-emit light in the blue region (e.g., 400-500 nm). These compounds include optical brighteners, fluorescent brightening agents (FBAs) and fluorescent whitening agents (FWAs).

The term "dyeing agents" as used herein generally refer to compounds which are OBAs. These agents are often used to enhance the appearance of color of fabric and paper, causing a perceived "whitening" effect, making materials look less yellow. A white surface treated with an optical brightener emits more visible light in the blue region than shines on it, making it appear brighter. The most common class of chemicals with brightening properties used in fine paper making is stilbene dyes.

The term "substrate" as used herein generally refers to cellulosic fiber, broke and water that is drainage from wet pulp stock. Cellulosic fiber are fibers made with ethers or esters of cellulose, which can be obtained from the bark, wood or leaves of plants, or from a plant-based material. Broke generally refers to fiber, paper or board that is discarded at any stage during its manufacture and is usually repulped. There are two types of broke—wet broke, which is accumulated at the wet end of the papermaking machine; dry broke which is accumulated at any stage on the dry end of the machine, including trimmings from the reeling, slitting and cutting operations, as well as paper or board rejected during sorting. Broke can be held if necessary in a broke chest located between processing stages for temporary storage during the paper making process. The water can also be a slurry. The water appears white in many cases due to the presence of fiber lines, filler and air bubbles that scatter light. Even if the process water appears brown, orange, or blue, due to the presence of black liquor, dyes, etc., it is still called white water. Most white water is reused within several seconds or minutes for the dilution of thick stock at a fan pump.

The term "reactive oxygen species" as used herein generally refers to a species such as may include singlet oxygen ($^1O_2$), superoxide radical ($O_2 \cdot ^-$), hydroperoxyl radical (HOO·), hydroxyl radical (HO·), acyloxy radical (RC(O)—O·), and other activated or modified forms of ozone (e.g., ozonides and hydrogen trioxide). Each of these ROS has its own oxidation potential, reactivity/compatibility profile, compatibility/selectivity and half-life.

The term "reactive species oxidant" as used herein generally refers to oxidant formulations containing or capable of evolving at least one reactive oxygen species and can evolve at least one reactive carbon species. Such reactive species enhance the oxidative or reductive performance of the precursor formulation constituents.

Embodiments

In some embodiments, a method provides for oxidizing, degrading and removal of OBA from a substrate.

In some embodiments, oxidation chemistry may be used for removal of dyeing agents also referred to as optical brightening agents (OBA) from a substrate. The substrate can include water, broke and cellulosic fiber. The oxidation chemistry used may have impacts on pH, scaling potential of fluids and toxicity of effluents. A relatively short-lived active oxidant may be a benefit for avoiding negative impacts on pulp quality, paper quality, and for minimizing oxidant corrosivity and environmental impacts. Selectivity of the oxidation chemistry towards different materials is also desirable for efficiency of oxidant use, compatibility with a variety of materials and avoidance of unnecessary or undesirable side reactions. Oxidant solutions that generate a variety of reactive oxygen species (ROS) in their treatment environments may be good candidates for achieving some or all of these attributes.

ROS may be generated in-situ by several chemical methods including the Fenton catalytic cycle with hydrogen peroxide and iron catalysts (produces hydroxyl and superoxide radicals), combining ozone with hydrogen peroxide (produces ozonides and oxygen-based radicals), and combining hypochlorite with hydrogen peroxide (produces singlet oxygen). Other methods of generating ROS may include photochemical approaches, which are generally very dilute in ROS and are not practical for large volume treatment systems or for highly scaling fluids or fluids with high turbidity.

Some ROS (e.g., hydroxyl radical and ozonides) are too short lived and too reactive to be practical in highly contaminated or hydrocarbon environments. Salt and carbonate may rapidly quench the hydroxyl radical. Ozone and stronger oxidants, like hydroxyl radical, oxidize salts to form toxic chlorate and bromate byproducts. Chlorine-containing oxidant formulations are typically more corrosive than peroxides, are less efficient for $H_2S$ oxidation and rapidly chlorinate unsaturated hydrocarbons.

In some embodiments, a method provides for oxidizing, degrading and removal of OBA from a paper making process. The methods may include providing a preferred ROS-producing oxidant formulation, peracetate oxidant solution.

In some embodiments, a method provides for oxidizing, degrading and removal of OBA from a substrate involving the use of peracetate oxidant solutions. The methods may include contacting the substrate with a peracetate oxidant solution. The methods may include mixing the substrate with the peracetate oxidant solution and oxidizing the OBA using the peracetate oxidant solution.

In some embodiments, a method provides for removal of OBA from cellulosic fiber, broke and water recovered from the paper making process involving the use of peracetate oxidant solutions.

In some embodiments, a method is provided for removal of OBA in paper mills thereby avoiding cross contamination of products that do not and cannot contain OBA.

In some embodiments, a method is provided for the degradation of OBA in cellulosic fiber and in process water streams (white water).

In some embodiments, one preferred ROS-producing oxidant formulation is a peracetate solution. The peracetate solution may include generating an alkaline hydrogen peroxide solution from the combination of an alkali and a hydrogen peroxide concentrate, mixing the alkaline hydrogen peroxide solution with an acyl donor such that a peracetate solution concentrate is formed. In some embodiments, the peracetate solution may include peracetate anions and a peracid. In some embodiments, the peracetate solution may include a pH from about pH 10 to about pH 12. In some embodiments, the peracetate solution has a molar ratio of peracetate anions to peracid ranging from about 60:1 to about 6000:1. ROS-generating peracetate oxidant solutions may contain no hydrogen peroxide, and are produced on site and on demand at alkaline pH. The peracetate oxidant solution produces multiple ROS by itself and when placed into contaminated environments.

In some embodiments, the ROS most important in peracetate oxidant solutions include singlet oxygen, superoxide radical, hydroperoxyl radical, acetyloxy radical and potentially other radical fragments. When a combination of these ROS are generated together in peracetate oxidant solutions they produce an oxidative-reductive potential (ORP) response in water that may exceed 900 mV (vs standard hydrogen electrode) around pH 7. These solutions may be more convenient and effective to use than other approaches. The dominant ROS may be selectively reactive such that they are effective in a variety of environments.

In some embodiments, a method may include making a reactive species formulation. The method may include providing an alkaline hydrogen peroxide solution. The method may include contacting the alkaline hydrogen peroxide solution with an acyl donor. A peracid concentrate may be produced by the contacting of the alkaline hydrogen peroxide with the acyl donor. The peracid concentrate may have a molar ratio of hydrogen peroxide to acyl donor reactive groups ranging from about 1:1.25 to about 1:4. The method may include maintaining the peracid concentrate pH value in a range from about pH 10 to about pH 12.

In some embodiments, a method of oxidizing, degrading and removing OBA in a substrate may include: providing a substrate and providing a peracid composition. The peracid composition may include a mixture of an alkali concentrate, a hydrogen peroxide and an acyl donor having a pH value ranging from about pH 10 to about pH 12. The peracid composition may include a first molar ratio of peracid anion to peracid acid ranging from about 60:1 to 6000:1. The peracid composition may include a second molar ratio of peracetate to hydrogen peroxide of 16:1 or more. The method may include contacting the peracid composition with the substrate. In some embodiments, the method may include mixing, after the contacting of the peracid composition and the substrate.

In some embodiments, a method removing OBAs in substrate further comprises a method of separating the OBAs and substrate may include: providing a substrate containing OBAs and providing a peracid composition. The peracid composition may include a mixture of an alkali concentrate, a hydrogen peroxide and an acyl donor having a pH value ranging from about pH 10 to about pH 12. The peracid composition may include a first molar ratio of peracid anion to peracid acid ranging from about 60:1 to 6000:1. The peracid composition may include a second molar ratio of peracetate to hydrogen peroxide of 16:1 or more. The method may include contacting the peracid composition with the white water. In some embodiments, the method may include mixing, after the contacting of the peracid composition and the substrate. In some embodiments, the method may include separating, after the contacting of the peracid composition and the mixing of substrate containing a population of microbes, into one of microbes, impurities and one of substrate.

In some embodiments, a method reducing the OBAs in substrate further comprises a method of maintaining the substrate in a range from about 50° C. to about 95° C. prior to and/or following contacting with a peracid composition. Thermal activation that accelerates ROS production rate is useful for microbial control in heated environments and hot chemical sanitizing processes. Peracetate oxidant is more effective for microbial control in alkaline water than chlorine bleach and peracetic acid. Peracetate oxidant solution can be thermally activated to enhance its production of ROS and biocidal activity. Thermal activation is useful for microbial control in warm and hot water environments such as cooling water loops, pulp and paper making processes, down-hole oil and gas well treatments, hot chemical sanitizing (including clean-in-place applications) and pasteurization. For example, pulp delignification and bleaching is very slow at room temperature (takes more than 1 hour to achieve modest bleaching) but is very rapid at 50° C. (30 minutes to achieve significant bleaching).

In some embodiments, a method of reducing OBAs in substrate further comprising acidification. This is useful when the substrate is cellulosic fiber. Addition of acid and subsequent decline in pH to about 2, resulted in the removal of OBA fluorescence and dye from cellulosic fiber. Acid is defined as a mineral acid or organic acid or a combination. Mineral acids include sulfuric, hydrochloric, hydrofluoric, hydrobromic, nitric, phosphoric. Organic acids include formic, acetic, citric, alkylated phosphonic acids, oxalic, methyl sulfonic acid, trifluoromethyl sulfonic acid, alkylated sulfonic acids, fatty acids.

In some embodiments, the combination of acidification and thermal activation accelerates the degradation of the OBA. Acidic conditions normally inhibit ROS activity at room temperature however, the combination of acidic conditions and thermal activation of peracetate oxidant solution accelerates ROS production rate resulting in enhanced OBA degradation.

Therefore, it was unexpected that peracetate oxidant solutions performed best for OBA oxidation and removal from pulp fiber under acidic conditions of less than pH 5.5. Elevated temperature was required to observe good OBA degradation performance, which demonstrated that thermal activation of peracetate oxidant solutions produces enhanced oxidation performance under acidic conditions. Additionally, acidification of the fiber being treated was necessary for the breakdown and removal of OBAs with peracetate oxidant solutions.

In contrast to the present invention, peracetic acid (containing acetic acid and hydrogen peroxide) showed very little OBA removal performance under the same elevated temperature and acidic conditions that were effective for peracetate oxidant solutions. This observation further supports the role of ROS in the degradation of OBAs when using thermally activated peracetate oxidant solutions in acidified conditions.

In some embodiments, a method of reducing OBAs in a slurry may include: providing a slurry and providing a peracid composition. The peracid composition may include a mixture of an alkali concentrate, a hydrogen peroxide and an acyl donor having a pH value ranging from about pH 10 to about pH 12. The peracid composition may include a first molar ratio of peracid anion to peracid acid ranging from about 60:1 to 6000:1. The peracid composition may include a second molar ratio of peracetate to hydrogen peroxide of 16:1 or more. The method may include contacting the peracid composition with the slurry. In some embodiments, the method may include mixing, after the contacting of the peracid composition and the slurry.

In some embodiments, a slurry for reducing OBAs from slurries of wood pulp and wood products, recycled paper and textiles and materials processed as slurries.

The peracetate oxidant solution provides several different oxidant species in a single solution including the peracetate parent oxidant and several daughter products formed in-situ including singlet oxygen, hydroperoxyl radical, superoxide radical and combined forms that impart high oxidative-reductive potentials (ORP) that are desirable for and correlated with effective microbial control. The combination of multiple oxidant species along with a high ORP can help mitigate resistance of microbes to disinfectants.

The presence of ROS or other reactive species in the formulations herein may in some cases be directly detected and it may be possible to determine the concentrations of certain reactive species (e.g., using spectroscopic methods). However, in some embodiment, in formulations herein the presence of reactive species may only be indirectly demonstrated by measurement of changing properties of the formulation (e.g., ORP measurements or pH change, by changes in concentration of precursors (e.g., rate of peroxyacetic acid concentration decline) or by changes in reactivity of the formulation (e.g., the rate of oxidation of dyes (bleaching rate)) or the rate or occurrence of oxidation of certain species (e.g., polysaccharide breakdown)).

The oxidative reductive potential (ORP) is a measure of how oxidizing or reducing a solution is relative to a standard reference potential measured in volts. Standard reference potentials are measured relative to the hydrogen/hydrogen ion reduction-oxidation potential of 0.000 V at unit activity for the standard hydrogen electrode (SHE). Generally, solutions with potentials greater than 0 V vs SHE are considered oxidizing (electron accepting) while solutions with potentials less than 0 V vs SHE are considered reducing (electron donating). The measured ORP of water is influenced by its pH or hydrogen ion activity. As the hydrogen ion activity (e.g., concentration, temperature) increases, the ORP of water increases to more positive values. ORP is also influenced by the presence of reducing or oxidizing agents relative to their standard reduction-oxidation potentials and solution activities.

Standard oxidation potentials are often cited to compare the oxidative strength of oxidants. The standard potential is a thermodynamic value which is always greater than the measured ORP in solution for a given oxidant. This difference is caused in part by kinetic factors, such as the over potential or activation barrier of electron transfer at an electrode surface and the solution activity of the oxidant, which is proportional to the concentration. As a result, the standard potential is not a reliable measure of the chemical reactivity or antimicrobial activity of an oxidant regarding its reaction rate or reaction mechanism with a substrate. In contrast, a solution's ORP can be correlated with the level of microbial control for a given oxidant by measuring the reduction in microbial content achieved at that ORP in a given environment.

For example, according to the standard potentials hydrogen peroxide is a stronger oxidant than hypochlorous acid. However, the ORP of hypochlorous acid (29 mM) at pH 7 is over 1.1 V (vs SHE) while the ORP of hydrogen peroxide (29 mM) at pH 7 is about 0.5 V (vs SHE) indicating that hypochlorous acid is the stronger oxidant and biocide. Free radicals of chlorine are strong electron acceptors and also rapidly attack and substitute unsaturated and aromatic hydrocarbons, amines, thiols, aldehydes, ketones, and biological materials such as DNA and proteins. Hydrogen peroxide is a strong electron acceptor, but it is not a free radical, is less chemically reactive and exhibits lower antimicrobial activity than chlorine. This difference in chemical reactivity is reflected in the ORP. In practice, chlorine is used as a broad-spectrum biocide in water treatment whereas hydrogen peroxide is not.

ORP is used as a general measure of the antimicrobial strength of a solution containing an oxidizing antimicrobial agent, biocide or disinfectant. ORP may be correlated to relative oxidant concentration for lower oxidant concentrations at constant pH and temperature. This feature is the basis for ORP monitoring systems sometimes used in water treatment and disinfection processes where oxidant dose may be adjusted to maintain a desired ORP and corresponding biocidal activity for a particular oxidant.

Water solutions containing oxidizing biocides which have ORP's of greater than about 650 mV (vs SHE) are generally considered to be suitable for disinfection (Suslow, T. "Oxidation-Reduction Potential (ORP) for Water Disinfection Monitoring, Control, and Documentation" Univ. California Publication 8149 http://anrcatalog.ucdavis.edu which is incorporated by reference as if fully set forth herein) while ORP's above about 800 mV (vs SHE) are suitable for sterilization. Below about 475 mV (vs SHE) there is typically little to no biocidal activity for oxidizing biocides even after long contact times. Known exceptions to these ORP benchmarks include in-situ generation of short-lived reactive oxygen species such as hydroxyl radical, by ultraviolet-activated hydrogen peroxide, or singlet oxygen, by dye-sensitized photo-activation of molecular oxygen. Although the peracetate oxidant solution produces short-lived ROS, the combination of ROS and the parent peracetate oxidant create a metastable complex or a new species which exhibits an elevated solution ORP which can be correlated with effective microbial control.

There are several limitations to ORP measurement as a method for evaluating antimicrobial activity. ORP is normally not sensitive to very short-lived reactive oxygen species such as hydroxyl radicals, singlet oxygen, hydrogen trioxide and hydroperoxide radical in the presence of parent oxidants such as, for example, hydrogen peroxide, peroxyacetic acid, molecular oxygen and ozone. ORP is not sensitive to non-oxidizing biocides and chemical reactivity which impart other mechanisms for disrupting cellular viability. Examples of non-oxidizing chemical biocides include glutaraldehyde, which acts by crosslinking protein structures, and antimicrobial quaternary ammonium compounds, which disrupt cell membranes. ORP is also insensitive to the tolerance of various microorganisms to a given biocide, which affects the concentration and contact time required to inactivate or destroy a specific microorganism. For example, chlorine use in water treatment is not effective against certain spores (e.g., *Cryptosporidium oocysts*) while chlorine dioxide and ozone are.

In some embodiments, methods of oxidation employ reactive oxygen species formulations as described herein. The oxidation method includes application of one or more selected reactive oxygen species formulations to an environment, a substrate in an environment or to a substrate that is to be subjected to oxidation. The terms environment and substrate are used herein broadly to refer to a place, a material, a chemical and/or a biological species that is to be subject to at least partial oxidation. The environment may be, among others, water in situ, for example, pipelines, tanks, and other equipment carrying raw waste water, greywater, ground water, tailing pond water, refinery waste water, oilfield produced water, various industrial and food processing waters, water recycling loops, pulp and paper mills, cooling towers and water loops, evaporation ponds and non-potable water systems. A substrate may be any item or place that are to be oxidatively cleaned for example, containers, tanks, pipes, counter tops, appliances, food preparation surfaces and equipment, food and beverage containers, filters, food items during food processing, that are subjected to oxidative cleaning.

In some embodiments, uses of the reactive oxygen species formulations are provided herein for various industrial or domestic oxidation, clean up and disinfection applications.

A method of cleaning OBA from paper machine and associated equipment.

In some embodiments, a method is provided for the ability to use peracetate oxidant solution as an alternative oxidant to the use of chlorine or other halogenated oxidants to avoid the generation of halogenated oxidation byproducts.

In some embodiments, a method is provided for avoiding the need to return cellulosic fiber to the bleaching stage For applications of the formulations herein the formulation is contacted with a substrate or environment to be oxidized or treated. Any means of contacting may be employed, that is suitable for retention of the oxidation activity of the formulation and that is suitable for the environment and/or substrate. Formulations are liquid and may be employed in a concentrated form or a diluted form. Formulations may be diluted, if desired, before, during or after initial contact. The concentration of formulations in contact with an environment and/or substrate may be varied during contact.

A given application may employ separate contacting events which may be the same or different and which may employ the same formulation or precursor formulation. A given application may employ contact with more than one formulation or precursor thereof. The environment and/or substrate may, for example, be contacted with an activated liquid formulation containing reactive oxygen species. Alternatively, the environment and/or substrate may be contacted with a liquid precursor formulation that will generate reactive oxygen species on activation and the formulation is activated as or after it comes into contact with the environment or substrate.

For example, the environment or substrate may itself provide for activation, such as providing acidity that affects ROS formation rates and changes in oxidant speciation, fragmentation behavior or reactivity caused by acid-base equilibria. One or more additional steps of activation to form additional reactive species may occur after the contact of the formulation or the precursor formulation with the environment and/or substrate. For example, redox active materials or charged materials including transition metal species, unsaturated organic materials, sulfides and suspended solids can interact with and react with the parent oxidant to initiate fragmentation of the parent peracetate oxidant leading to the formation of ROS. Thermal activation can also be used to increase the formation rate of ROS, increase the fragmentation rate of the peracetate and increase overall peracetate oxidant solution's antimicrobial activity, bleaching power and reactivity with impurities or substrates. Irradiation of peracetate-containing solutions with ultraviolet light may also be used to promote activation. Contact with the environment or substrate may be controlled by addition of a selected volume or concentration of formulation or its precursor to the environment or in contact with the substrate. Alternatively, contact may occur by addition, including controlled addition of the substrate to the formulation or a precursor thereof.

Contact may be combined with stirring or other agitation, with scrubbing, scraping or other abrasive method if appropriate for the environment and/or substrate. Contact may be combined with removal precipitant or other solids present or formed in the environment or on contact with the substrate. The environment or substrate may be pre-treated prior to contact. The treated environment to substrate may be subject to another form of cleaning or disinfection.

In some embodiments, sodium peracetate oxidant solution is used to control microbial growth in a printing paper mill in stock preparation and white water recovery. White water entrains fiber, chemicals and microbes from the paper web. Microbes have an opportunity to propagate during extended residence time in the white water chest. Pulp sources entering the machine chest, such as boke and recovered fiber, will carry elevated microbial loads after their recovery form the paper machine process. Microbial concentrations can exceed $10^6$ to $10^7$ cells/mL, a level that reduces paper quality, accelerates biofilm growth and microbially influenced corrosion, increases paper defects and odor problems. These problems increase the frequency of down time for maintenance and increase paper reject.

Several points exist where the peracetate oxidant solution can be added to the paper making process. Ideally the peracetate solution is added to a fluid (water and pulp) where there is a contact time of several minutes to allow for more effective microbial control in the presence of high solids and allowing for thermal activation of the peracetate in warm and hot water streams that are typical in a paper making process.

In some embodiments, a method is provided for reducing waste water volume used in paper making process.

In some embodiments, transport and storage of peracetate oxidant solutions is avoided by its generation from stable feedstocks at or near the point of use. The small amount of peracetate present on site is produced in water at dilute concentrations (less than 8%) thereby avoiding hazards associated with highly concentrated or pure oxidant materials and minimizing fugitive air emissions and worker exposure to harmful materials, VOCs or nuisance odors. Potential fugitive air emissions from the peracetate oxidant solution production process are a small amount of water vapor and oxygen gas. The produced peracetate oxidant solution concentrate is dispensed by means of a pump, eductor or other engineered conveyance device that transfers the liquid product in a contained system to the point of use. The peracetate oxidant solution is produced as needed on site and on demand thereby eliminating storage and handling of large quantities of the oxidant product material on site.

In some embodiments, peracetate oxidant solutions have the ability to reduce corrosion in pulp and paper mills serving to protect the integrity of pulp slurries, coating ingredients, whitewater loop, broke processing system, process equipment, and paper quality. Controlling sessile bacteria helps to prevent the accumulation of biofilm deposits which cause microbiologically influenced corrosion (i.e., biocorrosion). Slime deposits are often a combination of bacteria and fungi. Importantly, when biofilms and their detritus detach from surfaces in the wet end papermaking process, they can cause holes and other defects in finished paper products. Therefore, preventing biofilm growth helps to avoid such defects.

In some embodiments, peracetate oxidant solution is less corrosive than commonly used oxidizing biocides (chlorine, chlorine dioxide), especially when the biocides come in contact with various process materials such as steel, copper and brass alloys. Oxidizing biocides used in processes where elevated temperatures and turbulence are present in the liquid phase should ideally have low vapor pressures to minimize oxidant loss to evaporation and vapor phase corrosion of surrounding equipment and structures. It is important to consider corrosion rates of materials like metal alloys under various oxidant use conditions including shock treatments and bleaching at high concentrations, water treatment at lower concentrations and vapor corrosion in the head space above oxidant solutions.

An additional advantage of this invention is that the oxidative treatment with peracetate oxidant solutions contributes little damage to cellulosic fibers relative to chlorine dioxide and conventional bleach sequences.

Figure 6:
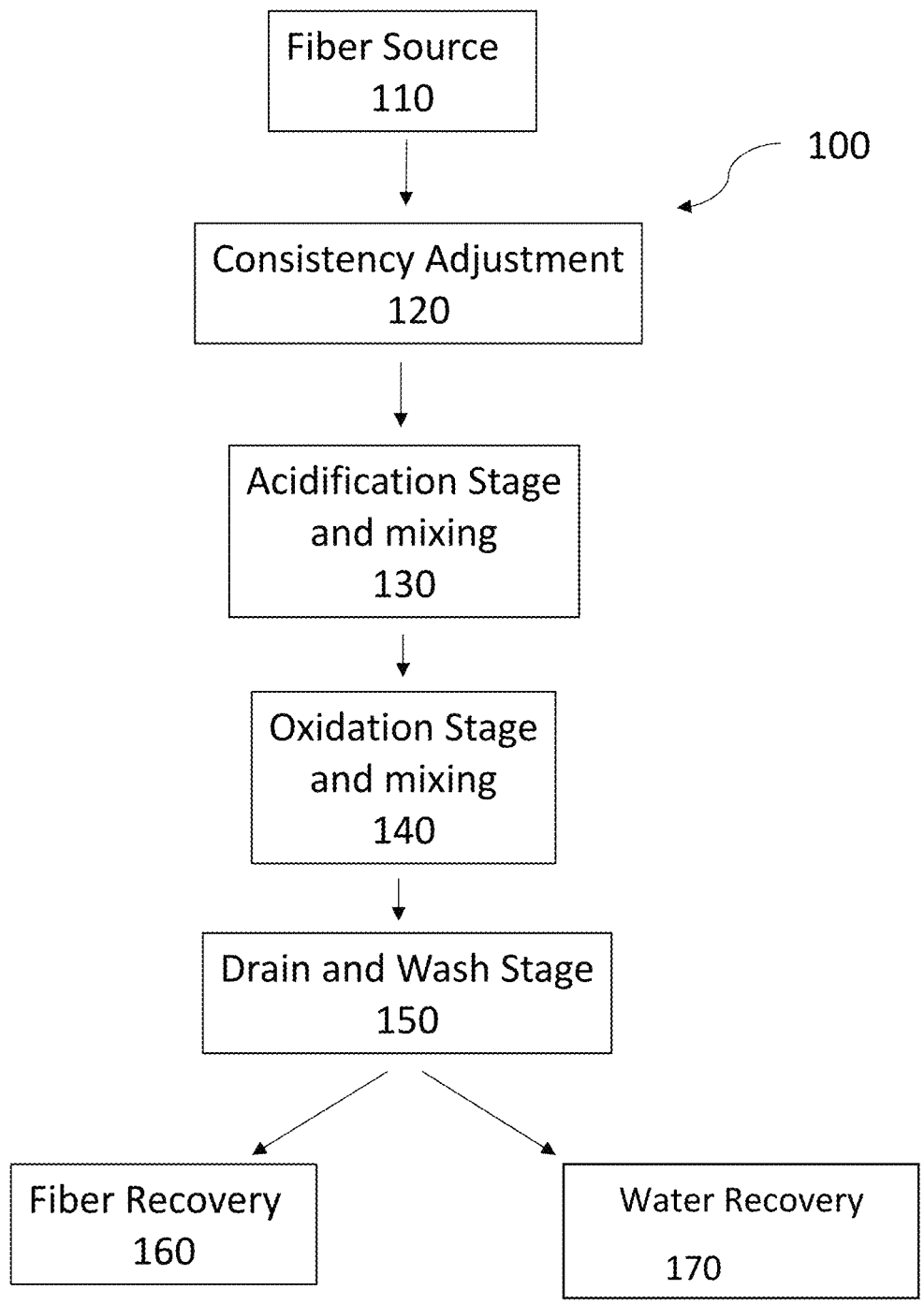
FIG. 6 depicts a schematic representation of a flow chart of an embodiment of a method for the removal of OBAs.

Referring now to an exemplary OBA removal process system 100 as shown in FIG. 6 for illustrative purposes only, a fiber source 110 may be adjusted in consistency with a water source 120, which may be, for example, white water, wash water, a fresh water (ground water, surface water) or treated municipal water. The consistency-adjusted fiber is heated to or maintained at an elevated temperature, preferably greater than 50° C., acidified by addition of an acid and mixed thoroughly 130. Mixing is preferably done during all of, and at least a portion of, the contact times (acid and oxidant steps). After a first period of contact time the acidified fiber is contacted with an oxidant, mixed thoroughly 140 and held at an elevated temperature for a second period of contact time. The spent acid and oxidant solution may then be drained from the fiber mass 150. The drained fiber may be washed with water. Fiber fines may retain a portion of dye while the majority of fiber is treated. Fiber fines may be separated from the treated fiber during the draining and washing steps resulting in fiber recovery 160 and water recovery 170.

EXAMPLES

Having now described the invention, the same will be more readily understood through reference to the following example(s), which are provided by way of illustration, and are not intended to be limiting of the present invention.

Example 1: Oxidation of OBA in Water

Water solutions of Leucophor® T100 (a diaminostilbene tetrasulfonic acid derivative) were treated with peracetate oxidant solution to demonstrate oxidation of the dye rendering it non-fluorescent. Untreated (control) and oxidant treated samples were analyzed by UV-Vis absorption spectroscopy to determine the extent of oxidation.

Oxidation tests were conducted on a prepared 3.32 mg/kg solution of Leucophor® T100 dye in distilled water. The test parameters are summarized in Table 1. Two 200 mL quantities of the solution were heated to 50° C. in separate mL glass beakers using a heated water bath. The initial pH was 6.8 and the initial ORP was about 530 mV vs SHE. To the dye solutions were added the appropriate volumes of peracetate oxidant solutions (2.0% wt/vol on a peracetate basis) to produce 50 and 500 mg/L initial oxidant concentrations. The oxidant was added and mixed rapidly using a magnetic stir bar and stir plate. The solutions were maintained at 50° C. without stirring for 60 min. The solutions were then allowed to cool to room temperature and stored in polyethylene bottles until spectroscopic analysis. Solutions were clear and colorless to the eye throughout the experiments.

TABLE 1

Leucophor T100 Oxidation Experimental parameters

| Parameter | 50 mg/L peracetate oxidant solutions treatment | 500 mg/L peracetate oxidant solutions treatment |
|---|---|---|
| Temperature (° C.) | 50 | 50 |
| pH at 1 min | 9.07 | 9.51 |
| ORP at 1 min (mV vs SHE) | 411 | 395 |
| pH at 60 min | 8.04 | 8.11 |
| ORP at 60 min (mV vs SHE) | 473 | 551 |
| Absorbance at 348 nm | 0.030 | 0.010 |

Figure 2:
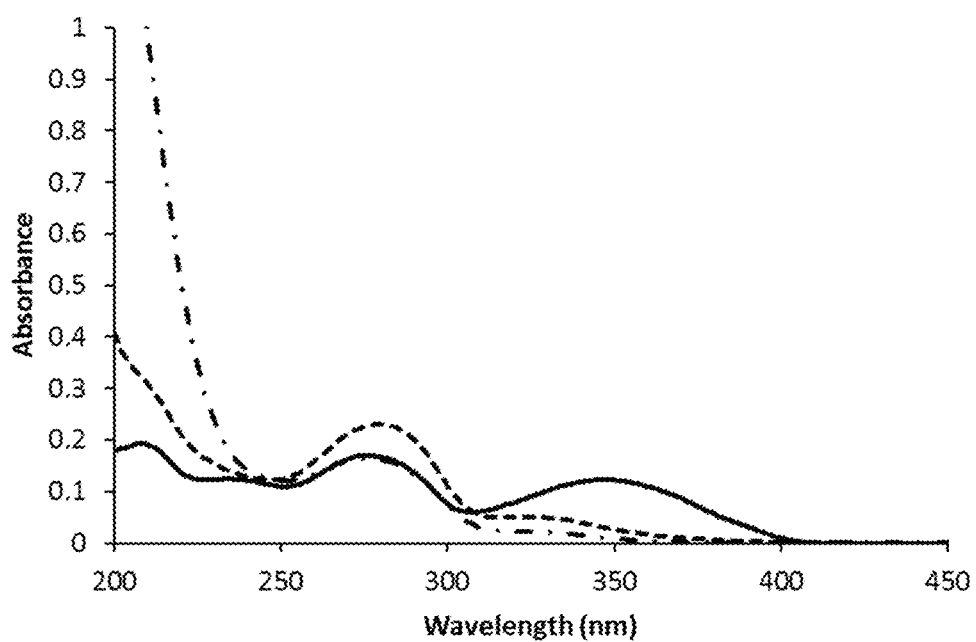
FIG. 2 depicts a graphical representation of an embodiment of a method of optical brightening removal in a control sample. The control T100 is represented by a solid line, the 50 mg/L peracetate oxidant solution treatment is represented by a dashed line and the 500 mg/L peracetate oxidant solution is represented by a dash dot dash line.

Absorption spectra were measured over the wavelength range of 200-450 nm using a Beckman UV-Vis spectrometer and a quartz sample cuvette with 1 cm path length. The samples were measured without dilution or any further preparation. Absorbance spectra of the pristine Leucophor® T100 dye solution and peracetate oxidant solutions treated solutions are illustrated in FIG. 2. The pristine Leucophor® T100 absorption band with a maximum at 348 nm (Absorbance of 0.123) is known to be assigned to the fluorescent (E)-isomer having the trans-conformation of the central carbon-carbon double bond of the stilbene dye structure. The absorption band maximum at 278 nm (absorbance of 0.165) is known to be assigned to the virtually non-fluorescent (Z)-isomer having the cis-conformation of the central carbon-carbon double bond of the stilbene dye structure. There are also higher energy electronic transitions that produce absorbance bands in the ultraviolet region of the spectrum, some of which can overlap with the isomeric absorption bands of interest. Oxidation products of the dye tend to absorb in the ultraviolet region as well as can be seen in the spectra of the oxidized samples.

The absorbance spectrum of the 50 mg/L peracetate oxidant solutions treated sample the 348 nm (E)-isomer absorbance band decreased nearly completely, in intensity. The 278 nm (Z)-isomer absorbance band intensity increased some suggesting isomerization from (E) to (Z) forms occurred under the treatment conditions.

The absorbance spectrum of the 500 mg/L peracetate oxidant solutions treated sample the 348 nm (E)-isomer absorbance band decreased completely in intensity as well as some of the overlapping, higher energy absorbance tail. The 278 nm (Z)-isomer absorbance band intensity decreased relative to the 50 ppm treated sample suggesting oxidation of both isomers to a significant extent. Higher energy (lower wavelength) absorbance intensity increased significantly in intensity. The remaining intensity around 278 nm may be attributed to other optical transitions not associated with the pristine dye isomers. Eliminating residual fluorescing OBA material in a water solution phase can be achieved with peracetate oxidant solutions oxidation treatment as shown in FIG. 2.

Example 2: Oxidation of OBA and/or Other Residues in the White Water Loop

A white water sample was obtained from a paper mill in eastern United States. The white water was from a paper line incorporating Leucophor® OBA products. The white water contained fiber fines coated with OBA.

A 200 mL quantity of the white water was put into a glass beaker and stirred at 50° C. with a magnetic stir bar and stir plate. The initial pH was 4.35 and the initial ORP was 635 mV vs SHE. To the white water was added the appropriate volume of peracetate oxidant solutions oxidant solution (2.0% wt/vol on a peracetate basis) to produce a 500 mg/L initial oxidant concentrations. The oxidant was added and mixed rapidly using a magnetic stir bar and stir plate. The solution was stirred at 50° C. for 60 min. At 60 min the white water had a pH of 4.64 and ORP of 855 mV vs SHE. The untreated and treated white water was stored in separate polyethylene bottles until spectroscopic analysis.

Figure 3:
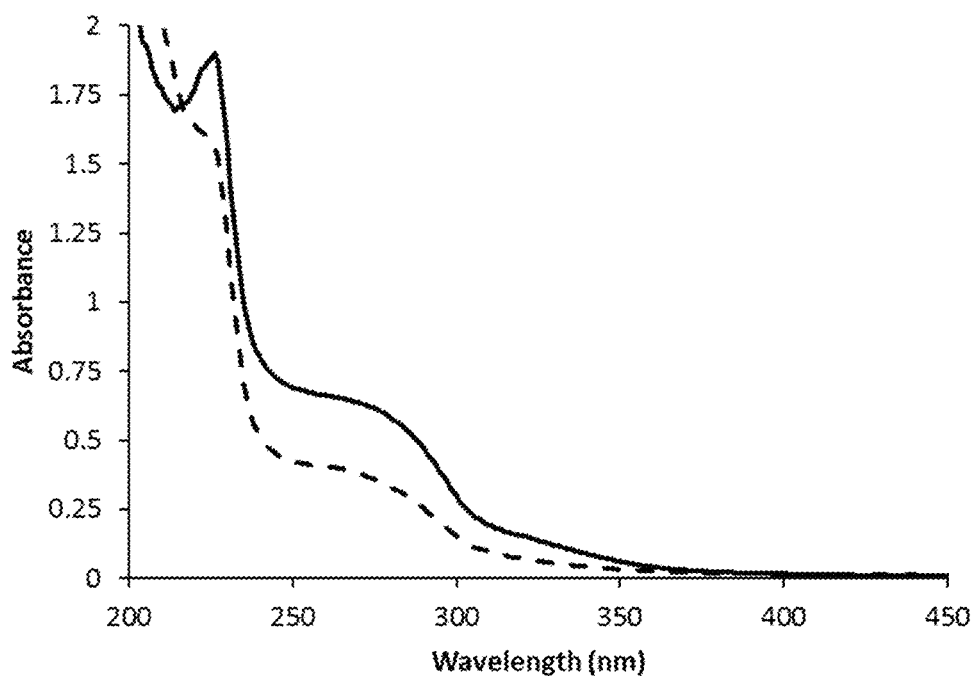
FIG. 3 depicts a graphical representation of an embodiment of a method of optical brightening removal from a white water sample represented by a solid line vs a treated white water sample represented by a dashed line.

Absorption spectra were measured over the wavelength range of 200-450 nm using a Beckman UV-Vis spectrometer and a quartz sample cuvette with 1 cm path length. The samples were filtered through 0.45 micron syringe filters (PVDF media) just prior to measurement without dilution. Absorbance spectra of the untreated white water and peracetate oxidant solutions treated white water are illustrated in FIG. 3. An absorbance spectrum of a pristine Leucophor® dye is not present, but higher energy absorbance bands are present, one of them centered around 265 nm. The intensity of this absorbance band at 265 nm was substantially reduced from 0.655 to 0.394 by oxidative treatment with peracetate oxidant solutions. A higher energy absorbance band at 227 nm was also substantially reduced as shown in FIG. 3.

Example 3: Removal of OBA from Broke Fiber with Peracetate Oxidant Solution

A sample of broke fiber was obtained from a paper mill in the eastern United States. The broke was from a paper line incorporating Leucophor® OBA products. The broke fiber appeared pale violet and exhibited an intense blue-white fluorescence under black light illumination. The pH of the broke fiber as received was about pH 4.5 at a 5.9% consistency. See FIGS. 4A-B.

The treatment goal was to eliminate OBA fluorescence and remove dye from the fiber. OBA removal tests were all conducted in glass beakers at 70° C. in a heated water bath. Fiber slurry samples were made to a constant consistency with distilled water and pre-heated. Samples were mixed during chemical addition and then at regular time intervals. During tests the pH and ORP were measured using hand held meters with temperature compensation.

A broke fiber sample prepared with 0.5% consistency and 200 mL volume was heated in a 1 L glass beaker to 70° C. A 4 normal sulfuric acid solution was added dropwise to the sample with stirring until the pH was 2.0. The acidified sample was held at 70° C. for 30 minutes. Then 30 mL of a 2.0% (wt/vol as peracetate) peracetate oxidant solution was thoroughly mixed into the sample (3000 ppm peracetate initial concentration). Gas evolution was observed when the oxidant was added and slowly declined over time. One minute after oxidant addition the pH was 7.4 and the ORP was 789 mV vs SHE. The pH slowly declined over the course of oxidation to pH 5.0 at 4 hours. The ORP increased during the first 30 minutes to 992 mV and then declined to 870 mV after 4 hours. The sample was cooled to room temperature and the fiber recovered by filtration with a Buchner funnel. The treated fiber was observed on a non-fluorescent background such as filter paper or a paper towel. The treated fiber appeared white under visible light (fluorescent lighting) and had no visible fluorescence under black light illumination.

The above procedure was also conducted without acidification, with about 50% more acid added and with an initial pH of 10. Each of these initial pH-adjusted conditions resulted in only partial reductions of fluorescence. The alkaline pH condition showed the least reduction of fluorescence. Conducting the above procedure at room temperature resulted in little reduction of fluorescence Another test was conducted using peracetic acid (15% wt/vol stock solution). A broke fiber sample prepared with 0.5% consistency and 200 mL volume was heated in a 1 L glass beaker to 70° C. A 4 normal sulfuric acid solution was added dropwise to the sample with stirring until the pH was 2.0. The acidified sample was held at 70° C. for 30 minutes. Then 4.0 mL of a 15% peracetic acid was thoroughly mixed into the sample (3000 ppm peracetic acid initial concentration). There was virtually no gas evolution observed when peracetic acid was added or over time. One minute after oxidant addition the pH was 1.82 and the ORP was 813 mV vs SHE. The pH slowly increased over the course of oxidation to about pH 2.1 at 5 hours. The ORP slowly declined to about 718 mV at 5 hours. The sample was cooled to room temperature and the fiber recovered by filtration with a Buchner funnel. The treated fiber was observed on a non-fluorescent background such as filter paper or a paper towel. The treated fiber appeared very pale blue-white under visible light (fluorescent lighting) and its fluorescence was only partially reduced under black light illumination A benefit of using the peractate oxidant is that the final pH is in the original range of the broke, about pH 4-5, which is compatible with reuse of broke fiber and white water without needing a pH adjustment after the treatment process.

When using an acidic oxidant, such as peracetic acid in the above example, the lower final pH of 2.1 would need to be readjusted to about pH 4-5 for reuse of broke fiber and white water.

Example 4 Treatment of Higher Consistency and Separation of Fines

A broke fiber sample prepared with 1.0% consistency and 200 mL volume was heated in a 1 L glass beaker to 70° C. Then 3 mL of 4 normal sulfuric acid solution was added to the sample with stirring. The acidified sample was held at 70° C. for 30 minutes at which time the pH was about 2.0. Then 30 mL of a 2.0% (wt/vol as peracetate) peracetate oxidant solution was thoroughly mixed into the sample (3000 ppm peracetate initial concentration). The sample was mixed briefly by stirring about every 10 minutes. Gas evolution was observed when the oxidant was added and slowly declined over time. Five minutes after oxidant addition the pH was 5.8 and the ORP was about 820 mV vs SHE. The pH slowly declined over the course of oxidation to pH 4.8 at 4 hours. The ORP increased slightly during the first 60-90 minutes and then declined to 820 mV after 4 hours. The sample was cooled slowly to room temperature over about 2 hours. The fiber recovered by filtration with a cheese cloth-lined colander. The spent oxidant liquor was drained off and the pulp rinsed with about 700 mL of cool tap water. The treated fiber appeared white under visible light (fluorescent lighting) and had no visible fluorescence under black light illumination (FIGS. 5A-B).

The spent oxidant liquor and wash water were collected in a 1 L beaker and the fines were allowed to settle for several hours. The settled fines were pale, sky blue in color under visible light and had no fluorescence under black light. The clear water phase was virtually colorless. The remaining color of the oxidized dye was more concentrated and persistent in the fines, which were washed out and separated from the bulk of the treated fiber.

The above procedure was repeated, but with about half as much mixing during the 4 hour oxidation time. The bulk of the fiber was pale sky-blue under visible light (fluorescent lighting) and had no visible fluorescence under black light illumination. Mixing has a significant impact on oxidation rate and OBA removal rate. Based on the comparison of results from these two tests, the OBA dye material appears to be oxidized in at least a two-step process where the first oxidation step is more rapid and produces a non-fluorescent, pale blue-colored intermediate before a slower oxidation step further degrades the dye material to colorless byproducts.

Example 5 Process for OBA Removal

An example of process steps that are taught in the present invention are shown in FIG. 6. A fiber source may be adjusted in consistency with a water source, which may be, for example, white water, wash water, a fresh water (ground water, surface water) or treated municipal water. The consistency-adjusted fiber is heated to or maintained at an elevated temperature, preferably greater than 50° C., acidified by addition of an acid and mixed thoroughly. After first period of contact time the acidified fiber is contacted with an oxidant, mixed thoroughly and held at an elevated temperature for a second period of contact time. The spent acid and oxidant solution may then be drained from the fiber mass. The drained fiber may be washed with water. Fines may be separated from the treated fiber during the draining and washing steps.

Effective mixing of fiber during chemical treatment is important for more efficient and rapid chemical reactions, oxidation and removal of surface-bound materials (dyes, binders, carriers, sizing, etc.) where diffusion-controlled processes are rate limiting. Mixing may be conducted by a circulation or transfer pump, by a mechanical stirring apparatus in a vessel, by a hydro pulper and any other means of mixing a slurry of fiber. Alternatively, the treatment fluids may be conveyed through a mass of fiber which may be encountered on a filter drum, filter belt or other apparatus that allows drainage of fluid from a mass of fiber that has been contacted with a fluid. The process described above may be conducted in batches or in a continuous process or a combination of batch and continuous process steps as described in FIG. 6.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of degrading dyeing agents from a substrate, comprising:
providing a substrate comprising a dyeing agent selected from the group consisting of optical brightening agents, fluorescent brightening agents, fluorescent whitening agents and combinations thereof, wherein the substrate as provided has properties of an acidic pH of less than pH 5.5 and a temperature of from about 50° C. to about 95° C.;
contacting the substrate having the properties with a peracetate oxidant solution;
wherein the contacting comprises mixing the substrate with the peracetate oxidant solution; and
oxidizing said dyeing agent of the substrate through oxidation activity provided by the peracetate oxidant solution generating reactive oxygen species as a consequence of the contacting;
and wherein the peracetate oxidant solution, as provided to the contacting, comprises:
peracetate anions and a peracid, wherein the peracetate oxidant solution has a pH from about 10 to about pH 12 and a molar ratio of peracetate anions to peracid ranging from about 60:1 to about 6000:1; and
either no hydrogen peroxide or a peracetate anion to hydrogen peroxide molar ratio of greater than about 16:1.

2. The method of claim 1, wherein;
the dyeing agent comprises an optical brightening agent with fluorescent activity, wherein the optical brightening agent absorbs light within a wavelength range of from 300-400 nm of the electromagnetic spectrum and re-emits light within a wavelength range of 400 to 500 nm in a blue region of the electromagnetic spectrum.

3. The method of claim 2, wherein oxidizing said dyeing agent comprises at least partially quenching a fluorescence of the dyeing agent.

4. The method of claim 2, wherein as a duration of time of contact of the substrate with the peracetate oxidant solution increases the amount of degradation of dyeing agent increases.

5. The method of claim 2, further comprising adjusting an agitation of the mixing of the substrate with the peracetate oxidant solution such that as the agitation is increased an amount of the oxidation of the dyeing agent is increased.

6. The method of claim 2, wherein contacting the substrate with the peracetate oxidant solution comprises reducing biofilms and microbial corrosion.

7. The method of claim 1, wherein the providing the substrate comprises acidifying of the substrate with the addition of acid to the substrate.

8. The method of claim 1, wherein the oxidizing said dyeing agent occurs during a paper making process.

9. The method of claim 8, wherein the substrate comprises a slurry comprising fiber with the dyeing agent on fiber surfaces and comprising water recovered from the paper making process.

10. The method of claim 9, comprising after the oxidizing, recycling the fiber for use in the paper making process.

11. The method of claim 9, wherein the fiber comprises broke fiber from the paper making process.

12. The method of claim 11, wherein the contacting the substrate with the peracetate oxidant solution occurs in a broke chest of the paper making process.

13. The method of claim 9, wherein the substrate comprises white water comprising the dyeing agent, and the oxidizing said dyeing agent occurs in a white water loop of the paper making process.

14. The method of claim 9, wherein the substrate comprises fiber of the paper making process and the method further comprises, after the oxidizing:
separating liquid with spent oxidant solution from the fiber and after the separating washing the fiber with wash water; and
after the washing, recycling the fiber for use in the paper making process.

15. The method of claim 8, comprising, after the oxidizing, recycling the substrate for further use within the paper making process.

16. The method of claim 15, wherein the substrate comprises a member selected from the group consisting of process water of the paper making process and broke fiber of the paper making process.

17. The method of claim 16, wherein the substrate comprises white water of the paper making process.

18. The method of claim 15, wherein the dyeing agent comprises an optical brightening agent with fluorescent activity, wherein the optical brightening agent absorbs light within a wavelength range of from 300 to 400 nm of the electromagnetic spectrum and re-emits light within a wavelength range of 400 to 500 nm in a blue region of the electromagnetic spectrum.

19. A method of treating a fiber for removal of optical brightening agent, comprising:
providing a fiber source comprising fiber contaminated with optical brightening agent;
preparing a slurry comprising the fiber contaminated with the optical brightening agent and water at an adjusted slurry consistency and at a temperature of greater than 50° C.;
preparing an acidified slurry with the fiber at a pH of less than 5.5, comprising adding acid to the slurry and mixing the slurry with the added acid to adjust a pH of the slurry to less than 5.5;
after a first contact period following the adding of the acid, adding a peracetate oxidant solution to the acidified slurry to form a treatment mixture; and
during a second contact period following the adding of the peracetate oxidant solution and with a temperature of the treatment mixture maintained at greater than 50° C., oxidizing the optical brightening agent in the treatment mixture by reactive oxygen species generated in the treatment mixture as a consequence of adding the peracetate oxidant solution;
wherein the peracetate oxidant solution comprises, at the time the peracetate oxidant solution is added to the acidified slurry:
peracetate anions and a peracid, wherein the peracetate oxidant solution has a pH from about 10 to about pH 12 and a molar ratio of peracetate anions to peracid ranging from about 60:1 to about 6000:1; and
either no hydrogen peroxide or a peracetate anion to hydrogen peroxide molar ratio is greater than about 16:1.

* * * * *